United States Patent Office 3,499,883
Patented Mar. 10, 1970

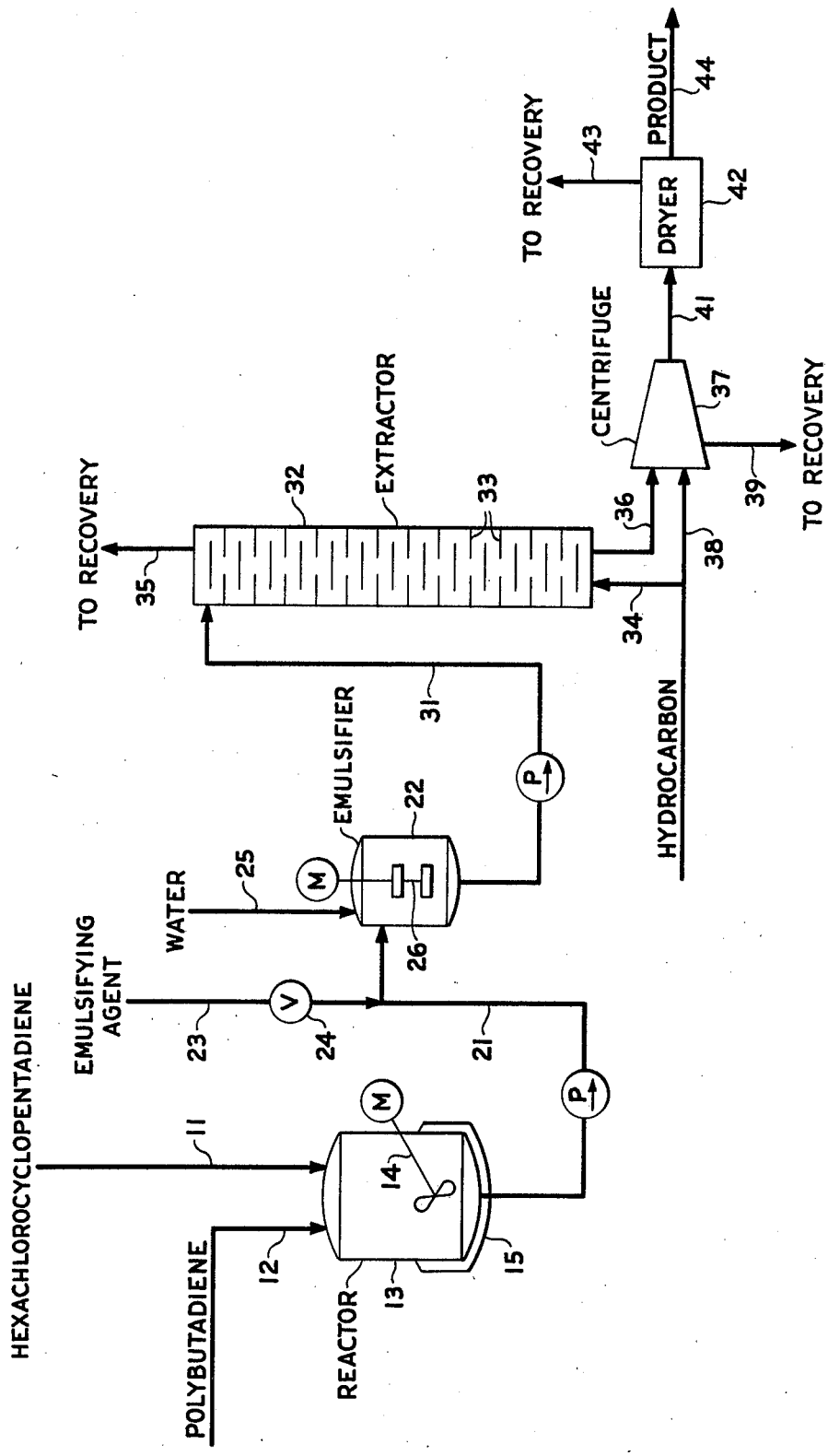

3,499,883
POLYMER RECOVERY AND PURIFICATION PROCESS
Herbert J. Rosen, Niagara Falls, N.Y., assignor to Hooker Chemical Corporation, Niagara Falls, N.Y., a corporation of New York
Filed Sept. 24, 1965, Ser. No. 489,892
Int. Cl. C08d 5/02; C08f 27/02
U.S. Cl. 260—94.7       13 Claims

ABSTRACT OF THE DISCLOSURE

Polymers of a butadiene polymer and a polyhalogenated cyclopentadiene are recovered and purified by a process which comprises contacting an emulsion comprised of (a) the polymer of a butadiene polymer and a polyhalogenated cyclopentadiene, (b) unreacted polyhalogenated cyclopentadiene, (c) an emulsifying medium, and (d) and emulsifying agent, with an acylic hydrocarbon to produce a hydrocarbon phase containing unreacted polyhalogenated cyclopentadiene and a second phase comprised of an emulsifying medium and polymer, and recovering the polymer from said second phase.

---

This invention relates to the recovery of polymers from solution. In other aspect, the invention relates to the purification of polymers to remove extraneous materials therefrom. More particularly, the invention relates to the recovery and purification of polymers formed by the reaction of a polyhalogenated cyclopentadiene with a butadiene polymer.

Highly useful halogen-containing polymeric materials are produced by reacting a polymer of butadiene with polyhalogenated cyclopentadienes having the formula:

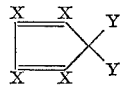

wherein X is selected from the group consisting of fluorine, chlorine and bromine, and Y is selected from the group consisting of fluorine, chlorine, bromine and an alkoxy radical. Generally, the alkoxy radicals have 1 or 2 carbon atoms, but higher carbon chain links, for example, up to 4 carbon atoms, can be employed. Typical polyhalogenated cyclopentadienes are hexachlorocyclopentadiene, hexabromocyclopentadiene, 1,1-dibromotetrachlorocyclopentadiene, 1,1-difluorotetrachlorocyclopentadiene, 1,1-dimethoxytetrachlorocyclopentadiene, 1,1-diethoxytetrachlorocyclopentadiene, and the like. Polymers of butadiene that can be reacted or adducted with the polyhalogenated cyclopentadienes are the various ethylenically unsaturated polybutadienes prepared by mass, solution or emulsion polymerization techniques, butadiene-styrene copolymers made by emulsion and solution methods, butadiene-styrene block copolymers, butadiene-acrylonitrile copolymers, and the like. Particularly useful are the polybutadienes which contain at least 30 percent of the cis-1,4-configuration, and preferably at least 80 percent of the cis-1,4-configuration, and still more preferably at least 90 percent of the cis-1,4-configuration.

In the process for adducting the halogenated cyclopentadiene to a butadiene polymer by the Diels-Alder reaction, it is preferred to utilize in the reaction mixture at least about 5 parts of polyhalogenated cyclopentadiene per part of butadiene polymer. However, lower ratios, such as 3 or 4 parts of halogenated cyclopentadiene can be used per part of butadiene polymer, but longer reaction times are then desirable. Much larger quantities of halogenated cyclopentadiene can be utilized, e.g., up to 100 parts of halogenated cyclopentadiene per part of butadiene polymer and higher. In fact, it is convenient to use the halogenated cyclopentadiene as the diluent in the reaction mixture. However, other diluents that are not deleterious to the reaction can be used, for example, the aromatic hydrocarbons such as benzene, toluene, xylene, and the like; chlorinated hydrocarbons such as trichloroethylene, tetrachloroethane, the chlorobenzenes, the chlorotoluenes, and the like; esters such as isobutyl acetate, ethyl butyrate, and the like. The ratio of solvent used in the reaction mixture generally does not exceed about 100 parts per part of butadiene polymer reacted. The reaction proceeds best at elevated temperatures, generally in the range of 70 to 200 degrees centigrade, preferably in the range of 100 to 170 degrees centigrade. It is generally convenient to conduct the reaction at atmospheric pressure, although, depending on the use of particular diluents and reaction temperatures, it is sometimes convenient to carry out the reaction at superatmospheric pressure or under vacuum. During the course of the reaction, some halogen halide may be produced. The color of the resulting product can be improved by absorbing the hydrogen halide by including a scavenger, such as an epihalohydrin or other epoxide, in the reaction zone. It is sometimes desirable to include other additives in the reaction mixture to control the molecular weight of the polymer product.

In most product applications, it is desirable to utilize the halogenated polymer of the invention in a form that is substantially free of unreacted halogenated cyclopentadiene. However, because of the relatively high boiling points of the halogenated cyclopentadienes, it is somewhat difficult to remove the unreacted polyhalogenated cyclopentadiene from the reaction product.

Accordingly, an object of the invention is to provide an imporved process for the recovery of the adduct of a butadiene polymer and a polyhalogenated cyclopentadiene from the reaction mixture from which the polymer is produced. Another object of the invention is to provide a process for the production of an adduct of a butadiene polymer and a polyhalogenated cyclopentadiene that is substantially free of unreacted polyhalogenated cyclopentadiene. A further object of the invention is to provide a polyhalogenated polymer product that has a low, residual polyhalogenated cyclopentadiene content. These and other objects and advantages of the invention will be apparent to one skilled in the art upon reading the following detailed specification and the accompanying drawing.

In accordance with this invention, there is provided a process which comprises contacting an emulsion of an adduct of a butadiene polymer and a polyhalogenated cyclopentadiene which contains unreacted or free polyhalogenated cyclopentadiene, with an acyclic hydrocarbon to facilitate the removal of the unreacted polyhalogenated cyclopentadiene from the polymer. In a preferred aspect of the invention, the process comprises (1) contacting an emulsion comprised of (a) the polymer of a butadiene polymer and a polyhalogenated cyclopentadiene, (b) unreacted polyhalogenated cyclopentadiene, (c) an emulsifying medium, and (d) an emulsifying agent, with an acyclic hydrocarbon to produce a hydrocarbon phase containing polyhalogenated cyclopentadiene, and a second phase containing emulsifying medium and solid polymer, and (2) recovering the polymer from said second phase. It is also within the scope of the invention to subject the recovered polymer to further purification steps including contacting the polymer or polymer slurry with additional acyclic hydrocarbon to remove residual, unreacted polyhalogenated cyclopentadiene therefrom.

The invention will be further described by reference to the accompanying drawing which is a flow sheet for a preferred embodiment of the process of the invention.

A polyhalogenated cyclopentadiene, such as hexachlorocyclopentadiene, and a butadiene polymer, such as polybutadiene, are introduced through conduits 11 and 12, respectively, into reactor 13. The reaction zone can comprise a single reactor operated either batchwise or continuously, or a group of reactors operated either batchwise or continuously in series and/or in parallel. Reactor 13 is provided with suitable agitation means such as agitator 14, and suitable heating means such as heating jacket 15. After a suitable reaction cycle in accordance with the disclosure given hereinbefore, the reaction mixture is transferred through conduit 21 to emulsifier 22. A suitable emulsifying agent is transferred through conduit 23 and control valve 24 to the reaction mixture in conduit 21. Alternatively, the emulsifying agent can be injected directly into the emulsifier 22. Emulsifying medium, such as water, is introduced to emulsifier 22 through conduit 25. The components are subjected to vigorous agitation by a suitable agitator 26 and the resulting emulsion is transferred through conduit 31 to extractor 32. The extraction zone can comprise a vertically disposed cylindrical column, such as depicted in the drawing, equipped with baffle plates 33, or other suitable means for increasing the agitation and contacting of the components in the extractor 32. The emulsion which enters the extractor 32 in the upper portion, i.e., at or near the top thereof, through conduit 31 flows in countercurrent contact with a hydrocarbon stream which enters the lower portion of the extractor 32, i.e., at or near the bottom thereof, through conduit 34. A hydrocarbon phase containing extracted, unreacted polyhalogenated cyclopentadiene exits from the extractor through conduit 35 and is passed to suitable recovery facilities (not shown). An aqueous slurry of polymer exits from the extractor 32 through conduit 36 and is passed to a suitable separation means such as centrifuge 37. A hydrocarbon wash stream can be introduced, if desired, to the centrifuge 37 through conduit 38. A solid polymer phase is recovered from the centrifuge through conduit 41 and is passed to drier 42. Liquid effluent is taken from the centrifuge through conduit 39 and passed to suitable recovery facilities (not shown). The liquid phase from the centrifuge can be readily separated into its components, water, hydrocarbon, emulsifying agent and unreacted polyhalogenated cyclopentadiene, for recycle to the appropriate steps of the process. Residual volatile matter, such as hydrocarbon, hexachlorocyclopentadiene, water, and other volatile compounds are discharged from the drier 42 through conduit 43 to suitable recovery facilities (not shown). The dry polymer product is recovered from the drier through conduit 44.

The preferred emulsifying medium is water. However, other emulsifying media can be employed, such as the dihydric alcohols, for example, ethylene glycol, diethylene glycol, propylene glycol, dipropylene glycol, and other alkylene glycols. Also suitable as emulsifying media are trihydric alcohols, such as glycerol, and the like. Various proportions of emulsifying media can be employed, depending somewhat upon subsequent process operations. However, the ratio is generally in the range up to 5 parts of emulsifying media, such as water, per part of reaction mixture, such as polymer and unreacted polyhalogenated cyclopentadiene. The ratio is preferably in the range of 0.5 to 2 parts of emulsifying medium per part by weight of reaction mixture.

Various emulsifying agents can be employed, including the non-anionic, anionic and cationic types, as well as mixtures thereof, such as mixtures of nonionic and anionic types. Suitable nonionic emulsifying agents include the alkylphenoxypoly(ethyleneoxy)ethanols, and the dialkylphenoxypoly(ethyleneoxy)ethanols, preferably those wherein the alkyl substitutent has 5 to 12 carbon atoms, and which have 1 to 20 ethyleneoxy groups. Typical members are octylphenoxypoly(ethyleneoxy)ethanol, nonylphenoxypoly(ethyleneoxy)ethanol and dodecylphenoxypoly(ethyleneoxy)ethanol. Also useful are the fatty acid esters of polyhydric alcohols or ether alcohols, for example, glycerol mono-stearate; esters of ethylene glycol, diethylene glycol, triethylene glycol and polyethylene glycol, for example, the condensation product of oleic acid with ethylene oxide; and fatty esters of sugar alcohols. Suitable anionic emulsifying agents include the alkali metal alkylbenzene sulfonates, particularly those wherein the alkali metal is sodium or potassium and the alkyl group has 8 to 20 carbon atoms. Typical members are sodium dodecylbenzene sulfonate and potassium dodecylbenzene sulfonate. Another suitable group of anionic emulsifying agents is the alkali metal alkyl sulfates, particularly those wherein the alkali metal is sodium or potassium and the alkyl group has 8 to 20 carbon atoms. A typical member is sodium lauryl sulfate. Also useful are the sulfonated aliphatic polyesters, free acids of complex phosphate esters, sodium salts of complex phosphate esters and sodium salt of disproportionated wood rosin. Another suitable group of anionic emulsifying agents is the alkali metal lignin sulfonates, such as sodium lignin sulfonate and potassium lignin sulfonate. Suitable cationic emulsifying agents include the fatty amides of monoethanolamines; fatty nitriles and fatty acid amides, such as oleic morpholide. Also useful are cationic agents such as N-coco-$\beta$-amino buteric acid, dicoco dimethyl ammonium chloride and polyoxyethylated alkylamines. Particularly suited for use in the process of the invention are mixtures of an anionic agent and a nonionic agent, such as a mixture of a sodium alkylbenzene sulfonate and an alkylphenoxypoly(ethyleneoxy)ethanol. The emulsifying agents are employed in a ratio of about 1 to 5 parts by weight per 100 parts of the butadiene polymer-polyhalogenated cyclopentadiene reaction product. Preferably the ratio is in the range of 2 to 4 parts per 100 parts by weight.

Emulsification of the reaction product is generally conducted at a temperature up to about 150 degrees centigrade, preferably in the range of 25 to 140 degrees centigrade. Residence time in the emulsification zone can vary considerably depending on the type of equipment employed, but would generally be in the range of 0.1 to 10 minutes. Emulsification can be carried out in various mechanical devices which subject the components to vigorous agitation. A small vessel equipped with any efficient mixer, such as a paddle-type mixer, is suitable, or other more elaborate devices, such as a high speed turbine, which give high shear agitation, can be used, in batch or continuous processes.

The emulsion resulting from the foregoing process is contacted with an acyclic hydrocarbon, generally of 3 to 12 carbon atoms, preferably of 5 to 12 carbon atoms, and which generally has a boiling point of up to about 200 degrees centigrade, but which preferably boils in the range of 25 to 150 degrees centigrade. Typical hydrocarbons include propane, butane, isobutylene, n-pentane, isopentane, hexane, heptane, octane, 2-ethylhexane, isooctane, diisobutylene, nonane, nonene, decane, decene, undecane, as well as various hydrocarbon fractions including petroleum ether and naphthas. The suitable hydrocarbons do not appreciably swell or dissolve the solid polymer. The proportions of hydrocarbon employed depends somewhat on the nature of the contacting equipment and other variables used in the process. However, the hydrocarbon is generally employed in the ratio of about 2 to 20 parts by weight of hydrocarbon per part by weight of polyhalogenated polymer, preferably in the range of 5 to 12 parts hydrocarbon per part of polymer. Various contacting temperatures and times can be employed, but these will generally be in the range of 0 to 60 degrees centigrade, or higher, preferably 5 to 50 degrees centigrade, and 0.1 to 5 hours. The hydrocarbon contacting step can be accomplished in batch-operated or continuously-operated equipment of various types. Thus, the contacting process can be carried out in a continuously operated, countercurrent apparatus of the nature depicted in the accompanying drawing wherein the emulsion is introduced in the upper zone of a vertically disposed contacting tower and flows downwardly in countercurrent contact with a stream of hydrocarbon which enters the lower portion of the contacting zone and flows upwardly. The hydrocarbon and aqueous phases can be removed from such a contacting zone at the opposite ends from which they enter the zone. Such contacting towers can be equipped with baffles or contacting trays or other devices for disrupting the flow of the two phases and thereby increasing the degree of agitation and extent of contacting of the two phases and thereby enhancing the ability of the hydrocarbon phase to absorb the unreacted polyhalogenated cyclopentadiene. As a result of the contacting step with the acyclic hydrocarbon, the polyhalogenated polymer precipitates from the emulsion and is recovered from the extraction or contacting zone in solid form, i.e., powder, granules, flakes, or other comminuted or particulate form, preferably as free flowing particles. The polymer is in the normally solid state at 30 degrees centigrade. The extraction step can also be carried out in a single enclosed vessel in which the emulsion is introduced into a volume of hydrocarbon and vigorously agitated. Thereafter, the phases are permitted to separate, and the resulting hydrocarbon phase can be decanted from the vessel, leaving the polymer in the aqueous phase. Then additional hydrocarbon is introduced to the aqueous polymer slurry and vigorous agitation is resumed to facilitate additional removal of polyhalogenated cyclopentadiene from the polymer. The sequence of contacting steps can be repeated as often as desired. Alternatively, both the hydrocarbon and aqueous phases resulting from the initial extraction step can be decanted from the vessel leaving a solid polymer phase in the bottom of the vessel. The hydrocarbon and unreacted polyhalogenated cyclopentadiene can be recovered from the decanted phases in suitable recovery processes. Thereafter, additional hydrocarbon can be introduced to the enclosed vessel to reslurry the solid polymer particles to facilitate additional removal of polyhalogenated cyclopentadiene therefrom. This sequence of contacting steps can be repeated as often as desired. Alternatively, the treatment can be carried out in a series of enclosed vessels wherein the effluent from one vessel is suitably phase separated, such as in a centrifuge, to recover the bulk of the hydrocarbon treating agent and the solid polymer is transferred to the next treating vessel in a series. Once the solid polymer is separated from the emulsion, it can be suitably treated with additional hydrocarbon in apparatus in which the solid polymer is held substantially stationary and the treating liquid is circulated through the bed of solid polymer. Thus, it is apparent that there are many methods for accomplishing the process of contacting the polymer emulsion for removal of the residual, unreacted polyhalogenated cyclopentadiene therefrom.

Following the initial extraction process wherein the emulsion is contacted with the hydrocarbon phase, the resulting aqueous slurry of polymer can be recovered in a suitable separation zone comprised of batch-operated or continuously-operated filters or centrifuges and the like. Likewise, following any subsequent treatment of the solid polymer with additional hydrocarbon to further remove residual polyhalogenated cyclopentadiene therefrom, the solid, purified polymer can be recovered from the hydrocarbon extraction medium in a suitable preparation zone comprised of batch-operated or continuously-operated filters or centrifuges and the like. Thereafter, the solid polymer is dried in a suitable batch-operated or continuously-operated drier, such as a rotary drier, tray drier, and the like. In the drying process, the solid polymer is generally contacted with a hot gas which is nonreactive with the polymer product, and which is at a temperature up to about 150 degrees centigrade. The liquid and vapor effluents from the final recovery steps of the process are passed to suitable recovery processes for the separation of the polyhalogenated cyclopentadiene from the hydrocarbon treating agent to facilitate recycle of the components to the reaction and purification zones, respectively.

The solid polymer product of the process of the invention generally contains less than about one weight percent of the high boiling, unreacted, polyhalogenated cyclopentadiene, preferably less than about 0.5 weight percent. The following tabulation shows the effect of free or unreacted hexachlorocyclopentadiene on the melting range of the polyhalogenated polymer product.

| Free hexachlorocyclopentadiene weight percent: | Melting range degrees centigrade |
|---|---|
| 14.3 | 125–131 |
| 4.9 | 169–181 |
| 1.4 | 180–188 |
| 0.2 | 185–197 |

The foregoing data were obtained with a hexachlorocyclopentadiene-polybutadiene product containing 58.9 weight percent chlorine and having an intrinsic viscosity of 0.324 measured in toluene. The melting range was observed by placing the polymer between cover glasses on a Fisher-Johns hot stage.

The invention is further described in the following specific examples which are intended to further illustrate the invention, but not to limit it. In these examples, the temperatures are given in degrees centigrade, and parts are by weight unless specified otherwise.

EXAMPLE 1

12 parts of a polybutadiene rubber having at least 95 percent cis-1,4 content were reacted with 145 parts by weight of hexachlorocyclopentadiene at 150 degrees centigrade for 5 hours. The reaction product comprised about 32.5 weight percent polyhalogenated polymer and 67.5 weight percent unreacted hexachlorocyclopentadiene. The reaction product was emulsified with 119 parts of water and 7 parts of a mixture of octylphenoxypoly(ethyleneoxy)ethanol containing about 10 ethyleneoxy groups per molecule, and sodium dodecylbenzene sulfonate. Thereafter, 145 parts of the resulting emulsion were sprayed through a pressure nozzle into an enclosed agitated vessel containing 166 parts of normal hexane. The mixture was agitated for one half hour and then the resulting polymer particles were permitted to settle with the water to the bottom of the vessel. The hydrocarbon phase was removed from the vessel by decantation. The remaining aqueous slurry was then extracted three times using 110 parts by weight of fresh normal hexane for each wash. The mixing times were 16, 0.5 and 1.25 hours, respectively. The slurry resulting from the final extraction step was filtered and the resulting polymer was dried in a rotary drier under vacuum. 31 parts of halogenated polymer containing 0.8 weight percent unreacted hexachlorocyclopentadiene was obtained as the product of the process.

EXAMPLE 2

Eight parts of a polybutadiene rubber having at least 80 percent cis-1,4 content were reacted with 96 parts of hexachlorocyclopentadiene for 5 hours at 150 degrees centigrade. The resulting syrup containing 67 weight percent unreacted hexachlorocyclopentadiene was emulsified with 100 parts of water and 4 parts of a mixture of octylphenoxypoly(ethyleneoxy)ethanol containing about 10 ethyleneoxy groups per molecule, and sodium dodecylbenzene sulfonate. The resulting emulsion was contacted with normal hexane in a 10-plate verticle contactor, such as depicted in the accompanying drawing, except that the contactor was additionally equipped with turbine mixer blades suspended between the plates from a central verticle shaft. The emulsion was introduced at the top of the extractor at the rate of 12 parts of emulsion per minute. Hexane was passed at the rate of 10 parts per minute into the bottom of the extraction column and flowed upward in countercurrent contact with the downwardly flowing emulsion. The turbine mixers provided excellent contacting of the phases. A stream of hexane and unreacted hexachlorocyclopentadiene was removed from the top of the extraction column. An aqueous slurry of polymer was removed from the bottom of the column. 32 parts of polymer containing 0.5 weight percent of reacted hexachlorocyclopentadiene were recovered from the aqueous slurry by filtration and drying.

Similar results are readily obtained by carrying out the process of Example 2 with petroleum ether or normal pentane as the acyclic hydrocarbon.

While the invention has been described with reference to certain specific embodiments, it will be recognized by those skilled in the art that many variations are possible without departing from the spirit and scope of the invention.

I claim:

1. A process for obtaining a polymer product containing less than about one weight percent of unreacted polyhalogenated cyclopentadiene of the formula

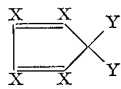

where X is selected from the group consisting of fluorine, chlorine and bromine and Y is selected from the group consisting of fluorine, chlorine, bromine and alkoxy, which consists essentially of contacting an emulsion comprised of (a) the polymer adduct of a polybutadiene having at least 80 percent of cis-1,4 configurataion and the polyhalogenated cyclopentadiene, (b) unreacted polyhalogenated cyclopentadiene, (c) an emulsifying medium, and (d) about 1–5 parts by weight, per 100 parts of halogenated polymer, of an emulsifying agent, with an acyclic hydrocarbon containing 3 to 12 carbon atoms and boiling at a temperature of 25 to about 200 degrees centigrade to produce a hydrocarbon phase containing unreacted polyhalogenated cyclopentadiene and a second phase comprised of emulsifying medium and polymer, and recovering the polymer from said second phase.

2. A process for obtaining a polymer product containing less than about one weight percent of unreacted hexachlorocyclopentadiene which consists essentially of contacting at a temperature in the range of 0 to 60 degrees centigrade an emulsion comprised of (a) a polymer adduct of a polybutadiene having at least 80 percent of cis-1,4 configuration and hexachlorocyclopentadiene, (b) hexachlorocyclopentadiene, (c) water, and (d) about 1–5 parts by weight, per 100 parts of halogenated polymer, of an emulsifying agent, with an acyclic hydrocarbon containing 3 to 12 carbon atoms and boiling at a temperature of 25 to about 200 degrees centigrade to produce a hydrocarbon phase containing hexachlorocyclopentadiene and an aqueous phase containing water and solid polymer, and recovering the polymer from the aqueous phase.

3. The process of claim 2 wherein the acyclic hydrocarbon is hexane.

4. The process of claim 2 wherein the acyclic hydrocarbon is petroleum ether.

5. The process of claim 2 wherein the acyclic hydrocarbon is pentane.

6. A process for obtaining a polymer product containing less than about one weight percent of unreacted polyhalogenated cyclopentadiene of the formula

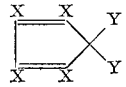

where X is selected from the group consisting of fluorine, chlorine and bromine and Y is selected from the group consisting of fluorine, chlorine, bromine and alkoxy, which consists essentially of (1) contacting an emulsion comprised of (a) a polymer adduct of a polybutadiene having at least 80 percent of cis-1,4 configuration and the polyhalogenated cyclopentadiene, (b) unreacted polyhalogenated cyclopentadiene, (c) an emulsifying medium, and (d) about 1–5 parts by weight, per 100 parts of halogenated polymer, of an emulsifying agent, with an acyclic hydrocarbon containing 3 to 12 carbon atoms and boiling at a temperature of 25 to about 200 degrees centigrade, (2) separating a hydrocarbon phase containing unreacted polyhalogenated cyclopentadiene from a second phase containing emulsifying medium and polymer, (3) contacting said second phase with additional acyclic hydrocarbon to remove additional unreacted polyhalogenated cyclopentadiene from the polymer, and (4) separating the emulsifying medium, acyclic hydrocarbon and unreacted polyhalogenated cyclopentadiene from the solid polymer.

7. A process for obtaining a polymer product containing less than about one weight percent of unreacted hexachlorocyclopentadiene which consists essentially of (1) contacting at a temperature in the range of 0 to 60 degrees centigrade an emulsion comprised of (a) a polymer adduct of polybutadiene having at least 80 percent of cis-1,4 configuration and hexachlorocyclopentadiene, (b) unreacted hexachlorocyclopentadiene, (c) water and (d) about 1–5 parts by weight, per 100 parts of halogenated polymer, of an emulsifying agent, with an acyclic hydrocarbon containing 5 to 12 carbon atoms and boiling at a temperature of 25 to 150 degrees centigrade, (2) separating a hydrocarbon phase containing unreacted hexachlorocyclopentadiene and an aqueous phase containing solid polymer, (3) contacting said aqueous phase with additional acyclic hydrocarbon to remove additional hexachlorocyclopentadiene from the polymer, (4) separating the resulting mixture of acyclic hydrocarbon and hexachlorocyclopentadiene from the aqueous phase, and (5) recovering the polymer from the aqueous phase.

8. The process of claim 7 wherein the acyclic hydrocarbon is hexane.

9. The process of claim 7 wherein the acyclic hydrocarbon is petroleum ether.

10. The process of claim 7 wherein the acyclic hydrocarbon is pentane.

11. The process for obtaining a polymer product containing less than about one weight percent of unreacted polyhalogenated cyclopentadiene of the formula

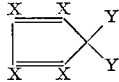

where X is selected from the group consisting of fluorine, chlorine and bromine and Y is selected from the group consisting of fluorine, chlorine, bromine and alkoxy, which consists essentially of (1) emulsifying the product of the reaction of a polybutadiene having at least 80 percent of cis-1,4 configuration and the polyhalogenated cyclopentadiene with an emulsifying medium and about 1–5 parts by weight, per 100 parts of halogenated polymer, of an emulsifying agent, (2) contacting the resulting emulsion with an acyclic hydrocarbon of 3 to 12 carbon atoms and boiling at a temperature of 25 to about 200 degrees centigrade to provide a hydrocarbon phase containing polyhalogenated cyclopentadiene and a second phase containing a solid polymer and said emulsifying medium, and (3) recovering the polymer from said second phase.

12. A process for obtaining a polymer product containing less than about one weight percent of unreacted polyhalogenated cyclopentadiene of the formula

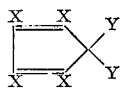

where X is selected from the group consisting of fluorine, chlorine and bromine and Y is selected from the group consisting of fluorine, chlorine, bromine and alkoxy, which consists essentially of (1) reacting a polybutadiene having at least 80 percent of cis-1,4 configuration with at least three parts by weight of the polyhalogenated cyclopentadiene per part of butadiene polymer, (2) emulsifying the resulting mixture with an emulsifying medium and about 1–5 parts by weight, per 100 parts of halogenated polymer, of an emulsifying agent, (3) contacting the resulting emulsion with an acyclic hydrocarbon having 3 to 12 carbon atoms and which boils at a temperature of 25 to 200 degrees centigrade to precipitate the polymer in solid form, (4) separating a hydrocarbon phase containing polyhalogenated cyclopentadiene from a second phase containing solid polymer and said emulsifying medium, (5) contacting said second phase with additional acyclic hydrocarbon to remove additional unreacted polyhalogenated cyclopentadiene from the polymer, and (6) separating emulsifying medium, acyclic hydrocarbon and polyhalogenated cyclopentadiene from the solid polymer.

13. A process which consists essentially of (1) reacting a polybutadiene having at least 80 percent of cis-1,4 configuration with at least five parts by weight of hexachlorocyclopentadiene per part of polybutadiene, (2) emulsifying the resulting reaction product with water and about 1–5 parts by weight, per 100 parts of halogenated polymer, of an emulsifying agent, (3) contacting at a temperature in the range of 0 to 60 degrees centigrade the resulting emulsion with an acyclic hydrocarbon having 5 to 12 carbon atoms and which boils at a temperature in the range of 25 degrees centigrade to 150 degrees centigrade, (4) separating the resulting hydrocarbon phase containing hexachlorocyclopentadiene from an aqueous phase containing polymer, (5) contacting said second phase with additional acyclic hydrocarbon to remove additional unreacted hexachlorocyclopentadiene from the polymer, and (6) recovering a polymer product containing less than about one weight percent of unreacted hexachlorocyclopentadiene.

References Cited

UNITED STATES PATENTS

| | | | |
|---|---|---|---|
| 2,952,711 | 9/1960 | Roberts | 260—648 |
| 3,074,921 | 1/1963 | Carter | 260—94.7 |
| 3,325,464 | 6/1967 | Weil | 260—94.7 |
| 3,225,022 | 12/1965 | Andersen et al. | 260—94.9 |
| 3,219,647 | 11/1965 | Dietz | 260—93.7 |
| 2,917,495 | 12/1959 | Cobb et al. | 260—85.1 |
| 3,268,475 | 8/1966 | Hoch et al. | 260—45.9 |
| 3,098,058 | 7/1963 | Schweiker et al. | 260—45.5 |

JOSEPH L. SCHOFER, Primary Examiner

WILLIAM HAMROCK, Assistant Examiner

U.S. Cl. X.R.

260—96, 648, 890